(12) United States Patent
Dry

(10) Patent No.: US 6,379,422 B1
(45) Date of Patent: Apr. 30, 2002

(54) DIRECT SMELTING PROCESS

(75) Inventor: Rodney James Dry, City Beach (AU)

(73) Assignee: Technological Resources Pty. Ltd., Melbourne (AU)

(*) Notice: Subject to any disclaimer, the term of this patent is extended or adjusted under 35 U.S.C. 154(b) by 0 days.

(21) Appl. No.: 09/632,730

(22) Filed: Aug. 4, 2000

(30) Foreign Application Priority Data

Aug. 5, 1999 (AU) .............................. PQ 2057

(51) Int. Cl.$^7$ .............................................. C21B 11/00
(52) U.S. Cl. .............................. 75/446; 75/500; 75/501; 75/502; 75/491; 75/492; 75/958
(58) Field of Search .................... 75/446, 491, 492, 75/500, 501, 502, 958; 266/144, 156

(56) References Cited

U.S. PATENT DOCUMENTS

| | | |
|---|---|---|
| 2,647,045 A | 7/1953 | Rummel |
| 3,844,770 A | 10/1974 | Nixon |

(List continued on next page.)

FOREIGN PATENT DOCUMENTS

| | | |
|---|---|---|
| AU | A-23864/84 | 1/1984 |
| AU | B-41064/85 | 4/1986 |
| AU | B-69707/87 | 9/1987 |
| AU | B-22448/88 | 5/1989 |
| AU | B-26831/88 | 7/1989 |
| AU | B-28802/89 | 8/1989 |
| AU | A-42859/89 | 4/1990 |
| AU | A-49307/90 | 9/1990 |
| AU | A-49309.90 | 9/1990 |
| AU | B-74840/91 | 10/1991 |
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 422 309 A1 | 4/1991 |
| EP | 541 269 A1 | 5/1993 |
| EP | 592 830 A1 | 4/1994 |
| EP | 657 550 | 6/1995 |
| GB | 2 043 696 A | 10/1980 |
| GB | 2 088 892 A | 6/1982 |
| WO | WO 89/01981 | 3/1989 |
| WO | WO 92/12265 | 7/1992 |
| WO | WO 93/06251 | 4/1993 |
| WO | WO 94/19497 | 9/1994 |

(List continued on next page.)

OTHER PUBLICATIONS

U.S. application No. 09/550,421, Dry, filed Apr. 17, 2000.
U.S. application No. 09/160,913, Dry, filed Sep. 25, 1998.

(List continued on next page.)

Primary Examiner—Melvyn Andrews
(74) Attorney, Agent, or Firm—Merchant & Gould, P.C.

(57) ABSTRACT

A process for direct smelting metalliferous feed material is disclosed. Iron oxides are partially reduced in a solid state in a pre-reduction vessel. The partially reduced iron oxides are smelted to molten iron in a direct smelting vessel which contains a molten bath of iron and slag and is supplied with a solid carbonaceous material as a source of reductant and energy and with an oxygen-containing gas for post-combusting carbon monoxide and hydrogen generated in the vessel. The direct smelting step generates an off-gas that contains sulphur and the off-gas is released from the direct smelting vessel. Part only of the off-gas released from the direct smelting vessel is used in the pre-reduction step to pre-reduce iron oxides in the pre-reduction vessel. Part only of the off-gas is used in the pre-reduction step in order to control the amount of sulphur that is returned with the partially reduced iron oxides to the direct smelting vessel.

8 Claims, 2 Drawing Sheets

U.S. PATENT DOCUMENTS

Figure 1:
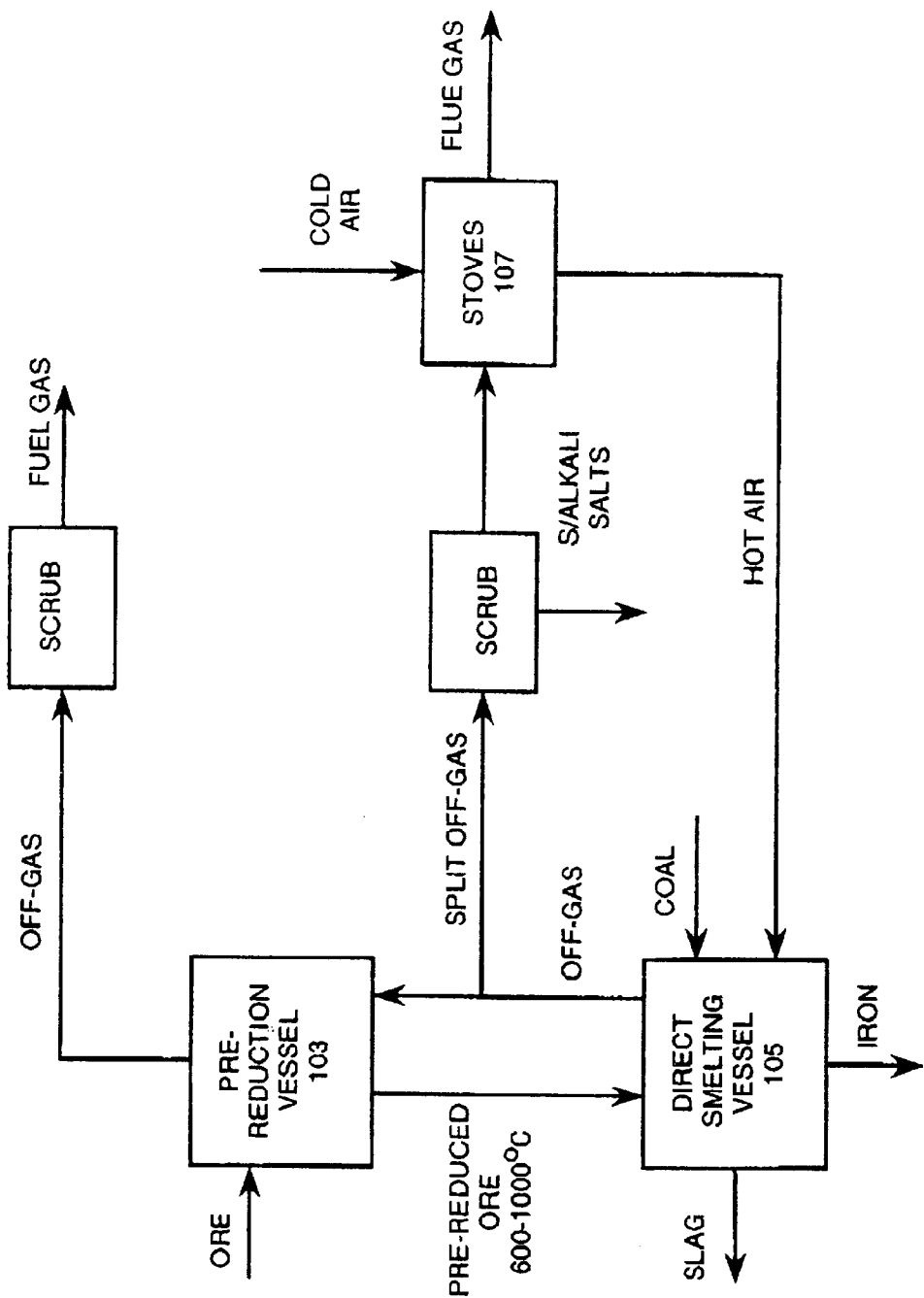

| | | |
|---|---|---|
| 3,845,190 A | 10/1974 | Yosim et al. |
| 3,888,194 A | 6/1975 | Kishigami et al. |
| 3,890,908 A | 6/1975 | von Klenck et al. |
| 3,894,497 A | 7/1975 | Helke et al. |
| 4,007,034 A | 2/1977 | Hartwig et al. |
| 4,053,310 A | 10/1977 | Stephens, Jr. |
| 4,145,396 A | 3/1979 | Grantham |
| 4,177,063 A | 12/1979 | Dickson |
| 4,207,060 A | 6/1980 | Zangs |
| 4,356,035 A | 10/1982 | Brotzmann et al. |
| 4,389,043 A | 6/1983 | Weber et al. |
| 4,400,936 A | 8/1983 | Evans |
| 4,402,274 A | 9/1983 | Meenan et al. |
| 4,431,612 A | 2/1984 | Bell et al. |
| 4,447,262 A | 5/1984 | Gay et al. |
| 4,448,402 A * | 5/1984 | Weber et al. ............... 266/183 |
| 4,455,017 A | 6/1984 | Wunsche |
| 4,468,298 A | 8/1984 | Byrne et al. |
| 4,468,299 A | 8/1984 | Byrne et al. |
| 4,468,300 A | 8/1984 | Byrne et al. |
| 4,481,891 A | 11/1984 | Takeshita et al. |
| 4,504,043 A | 3/1985 | Yamaoka et al. |
| 4,511,396 A | 4/1985 | Nixon |
| 4,565,574 A | 1/1986 | Katayama et al. |
| 4,566,904 A | 1/1986 | von Bogdandy et al. |
| 4,572,482 A | 2/1986 | Bedell |
| 4,574,714 A | 3/1986 | Bach et al. |
| 4,602,574 A | 7/1986 | Bach et al. |
| 4,664,618 A | 5/1987 | Gitman |
| 4,681,599 A | 7/1987 | Obkircher |
| 4,684,448 A | 8/1987 | Itoh et al. |
| 4,701,214 A | 10/1987 | Kaneko et al. |
| 4,718,643 A | 1/1988 | Gitman |
| 4,786,321 A | 11/1988 | Hoster et al. |
| 4,790,516 A | 12/1988 | Sugiura et al. |
| 4,798,624 A | 1/1989 | Brotzmann et al. |
| 4,804,408 A | 2/1989 | Puhringer |
| 4,849,015 A | 7/1989 | Fassbinder et al. |
| 4,861,368 A | 8/1989 | Brotzmann et al. |
| 4,874,427 A | 10/1989 | Hamada et al. |
| 4,890,562 A | 1/1990 | Gitman |
| 4,913,734 A | 4/1990 | Romenets et al. |
| 4,923,391 A | 5/1990 | Gitman |
| 4,940,488 A | 7/1990 | Maeda et al. |
| 4,946,498 A | 8/1990 | Weber |
| RE33,464 E | 11/1990 | Gitman |
| 4,976,776 A | 12/1990 | Elvander et al. |
| 4,999,097 A | 3/1991 | Sadoway |
| 5,005,493 A | 4/1991 | Gitman |
| 5,024,737 A | 6/1991 | Claus et al. |
| 5,037,608 A | 8/1991 | Tarcy et al. |
| 5,042,964 A | 8/1991 | Gitman |
| 5,050,848 A | 9/1991 | Hardie et al. |
| 5,051,127 A | 9/1991 | Hardie et al. |
| 5,065,985 A | 11/1991 | Takahashi et al. |
| 5,177,304 A | 1/1993 | Nagel |
| 5,191,154 A | 3/1993 | Nagel |
| 5,222,448 A | 6/1993 | Morgenthaler et al. |
| 5,238,646 A | 8/1993 | Tarcy et al. |
| 5,271,341 A | 12/1993 | Wagner |
| 5,279,715 A | 1/1994 | La Camera et al. |
| 5,301,620 A | 4/1994 | Nagel et al. |
| 5,302,184 A | 4/1994 | Batterham et al. |
| 5,322,547 A | 6/1994 | Nagel et al. |
| 5,332,199 A | 7/1994 | Knapp et al. |
| 5,333,558 A | 8/1994 | Lees, Jr. |
| 5,396,850 A | 3/1995 | Conochie et al. |
| 5,401,295 A | 3/1995 | Brotzmann |
| 5,407,461 A | 4/1995 | Hardie et al. |
| 5,415,742 A | 5/1995 | La Camera et al. |
| 5,443,572 A | 8/1995 | Wilkison et al. |
| 5,480,473 A | 1/1996 | Hardie et al. |
| 5,489,325 A | 2/1996 | Keogh et al. |
| 5,498,277 A | 3/1996 | Floyd et al. |
| 5,518,523 A | 5/1996 | Brotzmann |
| 5,529,599 A | 6/1996 | Calderon |
| 5,613,997 A | 3/1997 | Satchell, Jr. |
| 5,630,862 A | 5/1997 | Greenwalt |
| 5,640,708 A | 6/1997 | Conochie et al. |
| 5,647,888 A | 7/1997 | Keogh et al. |
| 5,683,489 A | 11/1997 | Hayashi et al. |
| 5,741,349 A | 4/1998 | Hubble et al. |
| 5,800,592 A | 9/1998 | den Hartog et al. |
| 5,802,097 A | 9/1998 | Gensini et al. |
| 5,869,018 A | 2/1999 | Stephens, Jr. |
| 5,871,560 A | 2/1999 | Fluch et al. |
| 5,938,815 A | 8/1999 | Satchell, Jr. |
| 6,143,054 A * | 11/2000 | Dry ............................ 75/502 |
| 6,197,088 B1 * | 3/2001 | Greenwalt .................. 75/492 |

FOREIGN PATENT DOCUMENTS

| | | |
|---|---|---|
| WO | WO 96/19591 | 6/1996 |
| WO | WO 96/31627 | 10/1996 |
| WO | WO 97/17473 | 5/1997 |
| WO | WO 97/20958 | 6/1997 |
| WO | WO 97/23656 | 7/1997 |
| WO | WO 98/27232 | 6/1998 |
| WO | WO 98/27239 | 6/1998 |
| WO | WO 99/16911 | 4/1999 |

OTHER PUBLICATIONS

U.S. application No. 09/331,277, Jai, Jun. 17, 1999.
U.S. application No. 09/331,272, Bates, filed Jun. 17, 1999.
U.S. application No. 09/509,314, Bates, filed Mar. 21, 2000.
U.S. application No. 09/535,665, Leigh, filed Mar. 21, 2000.
U.S. application No. 09/462,282, McCarthy, filed Mar. 16, 2000.
U.S. application No. 09/478,750, Dry, filed Jan. 6, 2000.
U.S. application No. 09/509,286, MCarthy, filed Mar. 21, 2000.
U.S. application No. 09/509,264, Dry, filed Mar. 21, 2000.
U.S. application No. 09/509,290, Dry, filed Mar. 21, 2000.
U.S. application No. 09/509,323, Dry, filed Mar. 21, 2000.
U.S. application No. 09/587,774, Bates, filed Jun. 6, 2000.
U.S. application No. 09/611,514, Bates Jul. 7, 2000.
U.S. application No. 09/634,059, Burke, filed Aug. 9, 2000.
U.S. application No. 09/669,397, Batterham, filed Sep. 26, 2000.
U.S. application No. 09/685,488, Burke, filed Oct. 10, 2000.
U.S. application No. 09/692,821, Dry, filed Oct. 12, 2000.
Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28, 1992.
Patent Abstracts of Japan, C–627, p. 109, Jp, A, 01–127613 (Kawasaki Steel Corp), May 19, 1989.
WPAT print–out for Brazilian patent application P19400123–5 (Weber) 1995 No Month.
Patent Abstracts of Japan, C–951, JP, A, 4–63217 (Kawasaki Heavy Ind. Ltd.), Feb. 28, 1992.
Patent abstracts of Japan, C–497, p. 115, JP, A, 62–280315 (Nippon Kokan K.K), Dec. 15, 1987.
Derwent Abstract Accession No. 87–039748/06, JP, A, 61–295334, Dec. 26, 1986.

* cited by examiner

DIRECT SMELTING PROCESS

The present invention relates to a process for producing molten iron from a metalliferous feed material, such as ores, partly reduced ores, and metal-containing waste streams, in a molten bath-based direct smelting process for producing molten iron from a metalliferous feed material.

The term "direct smelting process" is understood to mean a process that produces a molten material, in this case iron, from a metalliferous feed material.

One known molten bath-based direct smelting process for producing molten ferrous metal is the DIOS process. The DIOS process includes a pre-reduction stage and a smelt reduction stage. In the DIOS process ore (−8 mm) is pre-heated (750° C.) and pre-reduced (10 to 30%) in bubbling fluidised beds using offgas from a smelt reduction vessel which contains a molten bath of metal and slag, with the slag forming a deep layer on the metal. The fine (−0.3 mm) and coarse (−8 mm) components of the ore are separated in the pre-reduction stage of the process and the −0.3 mm is collected in a cyclone and injected into the smelt reduction furnace with nitrogen whilst the coarse ore is charged by gravity. Pre-dried coal is charged directly to the smelt reduction furnace from the top of the vessel. The coal decomposes into char and volatile matter in the slag layer and the ore dissolves in the molten slag and forms FeO. The FeO is reduced at the slag/metal and slag/char interfaces to produce iron. The carbon monoxide generated at the metal/slag and slag/char interface generates a foaming slag. Oxygen is blown through a specially designed lance that introduces the oxygen inside the foamed slag and improves secondary combustion. Oxygen jets burn carbon monoxide that is generated with the smelting reduction reactions, thereby generating heat that is transferred first to the molten slag and then to the slag/metal interface by the strong stirring effect of bottom blowing gas. The stirring gas introduced into the hot metal bath from the bottom or side of the smelt reduction vessel improves heat transfer efficiency and increases the slag/metal interface for reduction and therefore the vessel productivity and thermal efficiency. However, injection rates must be limited as strong stirring lowers secondary combustion due to increased interaction between the oxygen jet and metal droplets in the slag with subsequent lowering of productivity and increased refractory wear. Slag and metal are tapped periodically.

Another known direct smelting process for producing molten ferrous metal is the Romelt process. The Romelt process is based on the use of a large volume, highly agitated slag bath as the medium for smelting metalliferous feed material to metal in a smelt reduction vessel and for post-combusting gaseous reaction products and transferring the heat as required to continue smelting metalliferous feed material. The metalliferous feed material, coal, and fluxes are gravity fed into the slag bath via an opening in the roof of the vessel. The Romelt process includes injecting a primary blast of oxygen-enriched air into the slag via a lower row of tuyeres to cause necessary slag agitation and injection of oxygen-enriched air or oxygen into the slag via an upper row of tuyeres to promote post-combustion. The molten metal produced in the slag moves downwardly and forms a metal layer and is discharged via a forehearth. In the Romelt process the metal layer is not an important reaction medium.

Another known direct smelting process for producing molten ferrous metal is the AISI process. The AISI process includes a pre-reduction stage and a smelt reduction stage. In the AISI process pre-heated and partially pre-reduced iron ore pellets, coal or coke breeze and fluxes are top charged into a pressurised smelt reactor which contains a molten bath of metal and slag. The coal devolatilises in the slag layer and the iron ore pellets dissolve in the slag and then are reduced by carbon (char) in the slag. The process conditions result in slag foaming. Carbon monoxide and hydrogen generated in the process are post combusted in or just above the slag layer to provide the energy required for the endothermic reduction reactions. Oxygen is top blown through a central, water cooled lance and nitrogen is injected through tuyeres at the bottom of the reactor to ensure sufficient stirring to facilitate heat transfer of the post combustion energy to the bath. The process offgas is de-dusted in a hot cyclone before being fed to a shaft type furnace for pre-heating and pre-reduction of the pellets to FeO or wustite.

Another known direct smelting process which, unlike the above-described processes, relies on a molten metal layer as a reaction medium is generally referred to as the HIsmelt process and includes the steps of:

(a) forming a molten bath having a metal layer and a slag layer on the metal layer in a direct smelting vessel;

(b) injecting metalliferous feed material and coal into the metal layer via a plurality of lances/tuyeres;

(c) smelting metalliferous material to metal in the metal layer;

(d) causing molten material to be projected as splashes, droplets, and streams above a quiescent surface of the molten bath to form a transition zone; and (d) injecting an oxygen-containing gas into the vessel via one or more than one lance/tuyere to post-combust reaction gases released from the molten bath, whereby ascending and thereafter descending splashes, droplets and streams of molten material in the transition zone facilitate heat transfer to the molten bath, and whereby the transition zone minimises heat loss from the vessel via the side walls in contact with the transition zone.

A preferred form of the HIsmelt process is characterized by forming the transition zone by injecting carrier gas, metalliferous feed material, coal, and fluxes into the bath through lances that extend downwardly and inwardly through side walls of the vessel so that the carrier gas and the solid material penetrate the metal layer and cause molten material to be projected from the bath.

This form of the HIsmelt process is an improvement over earlier forms of the process which form the transition zone by bottom injection of carrier gas and coal through tuyeres into the bath which cause droplets and splashes and streams of molten material to be projected from the bath.

The Romelt, DIOS, AISI and HIsmelt direct smelting processes can use coal as the source of energy and reductant. This is an advantage of the direct smelting processes over blast furnace technology which requires coke as the source of energy/reductant.

The Romelt, DIOS, AISI and HIsmelt direct smelting processes can operate with a wide range of metalliferous feed materials.

Iron ore is the major source of metalliferous feed materials for producing molten iron via the Romelt, DIOS, AISI, and HIsmelt processes.

One process option for the direct smelting processes is to supply iron ore directly to direct smelting vessels.

Another process option is to pre-heat and partially reduce iron ore in a solid state in pre-reduction vessels (which could be a shaft furnace or a fluidised bed or any other suitable vessel), transfer the pre-heated/partially reduced iron ore to direct smelting vessels containing a molten bath of iron and slag, and smelt the pre-heated/partially reduced iron ore to molten iron in the direct smelting vessels. This process option may also include using off-gas from the direct smelting vessels to pre-heat/pre-reduce iron ore in the pre-reduction vessels. One advantage of the process option is that it provides an opportunity to minimise total energy consumption. One disadvantage of the process option is that undesirable impurities, typically coal-derived impurities such as sulphur and alkali salts, which volatilise in direct smelting vessels and are discharged as part of the off-gas, return to the direct smelting vessels with the pre-heated/partially reduced iron ore and accumulate in the vessels. Specifically, sulphur reacts with FeO in the pre-reduction vessels and forms FeS and alkali salts condense in the pre-reduction vessels, and the FeS and condensed alkali salts are transferred to the direct smelting vessels with the pre-heated/partially reduced iron ore. The return of FeS into a direct smelting vessel disrupts the reaction sites of the smelting process and can significantly affect production. One solution to this issue is to increase the temperature of the medium for smelting. However, this leads to increased refractory wear and if pursued too far leads to the partitioning of phosphorus into the metal rather than the slag, and this is a major disadvantage.

An object of the present invention is to alleviate the disadvantage of the known 2-stage direct smelting process described in the preceding paragraph and in particular where the smelting medium is metal.

According to the present invention there is provided a process for direct smelting metalliferous feed material which includes the steps of:

(a) partially reducing iron oxides in a solid state in a pre-reduction vessel and producing partially reduced iron oxides;

(b) direct smelting partially reduced iron oxides produced in step (a) to molten iron in a direct smelting vessel which contains a molten bath of iron and slag and is supplied with a solid carbonaceous material as a source of reductant and energy and with an oxygen-containing gas for post-combusting carbon monoxide and hydrogen generated in the vessel;

(c) generating an off-gas that contains sulphur in direct smelting step (b) and releasing the off-gas from the direct smelting vessel; and (d) using only part of the off-gas released from the direct smelting vessel in pre-reduction step (a) to pre-reduce iron oxides in the pre-reduction vessel to control the amount of sulphur that is returned to the direct smelting vessel from the pre-reduction vessel.

The effect of step (d) of using only part rather than all of the off-gas from the direct smelting vessel in pre-reduction step (a) is to at least minimise the rate of build-up of undesirable impurities, typically coal-derived impurities, in the direct smelting vessel. As is indicated above, a disadvantage of the known 2-stage direct smelting process is that a number of undesirable impurities, typically coal-derived impurities such as sulphur and alkali salts, that are volatilised in direct smelting vessels are recovered in pre-reduction vessels and thereafter are returned to the direct smelting vessels.

Preferably step (d) includes controlling the amount of off-gas released from the direct smelting vessel and used in pre-reduction step (a) so that the amount of sulphur in molten iron produced in direct smelting step (b) is less than 0.2 wt % of the total weight of the molten iron.

Preferably the process includes processing the remainder of the off-gas released from the direct smelting vessel for heating and/or for power generation without returning the majority of the sulphur in this part of the off-gas to the direct smelting vessel.

Preferably direct smelting step (b) includes injecting pre-heated air or oxygen-enriched air into the direct smelting vessel as the oxygen-containing gas.

More preferably the process includes using a first stream of the off-gas from the direct smelting vessel in pre-reduction step (a) and using a second stream of the off-gas as a source of energy for heating air or oxygen-enriched air before supplying the air or oxygen-enriched air to the direct smelting vessel.

Preferably the second stream includes at least 20% by volume of the off-gas released from the direct smelting vessel.

More preferably the second stream includes at least 30 vol. % of the off-gas released from the direct smelting vessel.

It is preferred particularly that the second stream includes at least 40 vol. % of the off-gas released from the direct smelting vessel.

Preferably the process includes removing entrained sulphur and alkali salts from the second stream prior to using the second stream as the source of energy for heating air or oxygen-enriched air.

Preferably the oxygen-enriched air contains less than 50 volume % oxygen.

Preferably pre-reduction step (a) pre-heats the iron ore to a temperature in the range of 600–1000° C.

Preferably the off-gas from pre-reduction step (a) is used as a fuel gas for heating or power generation.

Smelting step (b) may include any suitable direct smelting process and use either the metal or the slag as the smelting medium.

Preferably smelting step (b) includes using the metal as a smelting medium and more preferably as the principal smelting medium.

Preferably smelting step (b) includes direct smelting partially reduced iron oxides in accordance with the HIsmelt process which includes the steps of:

(i) forming the molten bath with a molten iron layer and a molten slag layer on the iron layer in the direct smelting vessel;

(ii) injecting the partially reduced iron oxides and coal into the iron layer via a plurality of lances/tuyeres;

(iii) smelting the partially reduced iron oxides to molten iron in the iron layer;

(iv) causing molten material to be projected as splashes, droplets, and streams into a space above a nominal quiescent surface of the molten bath and forming a transition zone; and (v) injecting the oxygen-containing gas into the direct smelting vessel via one or more than one lance/tuyere and post-combusting carbon monoxide and hydrogen released from the molten bath, whereby the ascending and thereafter descending splashes, droplets, and streams of molten material in the transition zone facilitate heat transfer to the molten bath, and whereby the transition zone minimises heat loss from the vessel via a side wall of the vessel that is in contact with the transition zone.

The term "quiescent surface" in the context of the molten bath is understood herein to mean the surface of the molten bath under process conditions in which there is no gas/solids injection and therefore no bath agitation.

Figure 2:
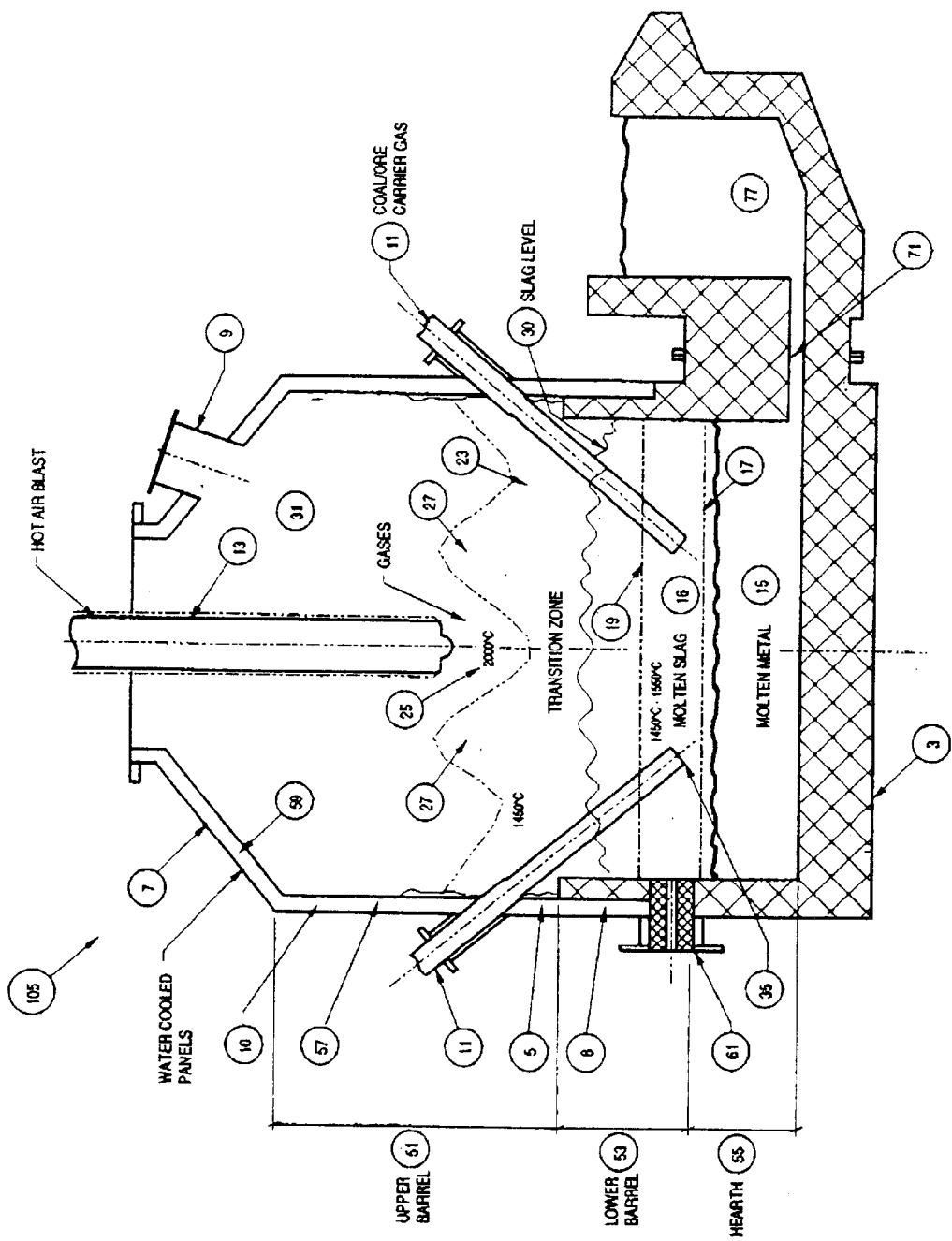

The present invention is described further by way of example with reference to the accompanying drawings, of which:

FIG. 1 is a flow sheet, in largely schematic form, of one preferred embodiment of the process of the present invention; and FIG. 2 is a vertical section through a preferred form of a direct smelting vessel for use in the process illustrated in FIG. 1.

With reference to FIG. 1, iron ore, typically in the form of fines is heated and partially reduced in a pre-reduction vessel 103 and is then transferred at a temperature in the range of 600–1000° C. to a direct smelting vessel 105 and smelted to molten iron in a molten bath in that vessel.

Coal, fluxes, and oxygen-enriched air are supplied to the direct smelting vessel 105. The coal is provided as a source of energy and reductant; the oxygen-enriched air is provided to post-combust combustible reaction products generated in the process; and the flux is provided to form slag.

The pre-reduction vessel 103 may be of any suitable type and configuration for the iron ore feed material. For example, if the iron ore feed is lump ore, typically the pre-reduction vessel is a shaft furnace. Further, if the iron ore feed is fines, typically the pre-reduction vessel is a fluidised bed-based furnace.

The iron ore feed material is heated and partially reduced in the pre-reduction vessel 103 by off-gas released from the direct smelting vessel 105. The off-gas passes out of the pre-reduction vessel 103 and may be used as a low energy fuel gas for heating or power generation (not shown).

The off-gas may be transferred directly from the direct smelting vessel 105 to the pre-reduction vessel 103. In that case, the extent of heating and reduction in the pre-reduction vessel 103 is a function of the temperature and composition of the off-gas, which in turn is a function of the direct smelting process operating in the direct smelting vessel 105.

The off-gas may also be transferred from the direct smelting vessel 105 to the pre-reduction vessel 103 via a gas reformer (not shown) or other means which pre-condition the off-gas upstream of the pre-reduction vessel 103.

In accordance with the present invention, the off-gas from the direct smelting vessel 105 is split into two (or more) streams, with one stream being transferred directly or indirectly to the pre-reduction vessel 103 as described in the preceding paragraphs, and with the other stream being used on the combustion side of stoves 107 which pre-heat oxygen-enriched air for post-combusting reaction products in the direct smelting vessel 105.

In the preferred embodiment of the present invention the purpose of splitting the off-gas stream is two-fold.

Firstly, transferring only part of the off-gas stream to the pre-reduction vessel 103 reduces the rate of accumulation in the direct smelting vessel 105 of undesirable impurities, typically coal-derived impurities such as sulphur and alkali salts, that volatilise in the direct smelting process and are recovered in the prereduction step and are returned to the direct smelting vessel 105 with incoming partially reduced iron ore.

Secondly, using part of the off-gas stream to heat the stoves 107 is beneficial from the viewpoint of minimising total energy consumption. This second advantage applies particularly to air-based direct smelting processes where there is usually more off-gas than is required for heating/reducing iron ore in the pre-reduction vessel 103 and splitting the off-gas does not adversely affect the operation of the pre-reduction vessel 103.

The direct smelting process operating in the direct smelting vessel 105 may be any suitable process and may be a cold oxygen-based system.

The preferred direct smelting process operated in the direct smelting vessel is the HIsmelt process as described in general terms hereinagter with reference to FIG. 2, and in more detail in International application PCT/AU99/00538 in the name of the applicant (which corresponds to commonly assigned U.S. patent application Ser. No. 09/462,282), and the disclosure in the patent specification lodged with the International application is incorporated herein by cross-reference.

In the context of the present invention, the direct smelting process described in the International application is based on:

(a) forming a molten bath having a molten iron layer and a molten slag layer on the iron layer in the direct smelting vessel 105;

(b) injecting the partially reduced iron ore and coal and fluxes into the iron layer via a plurality of lances/tuyeres;

(c) smelting the partially reduced iron ore to molten iron in the metal layer;

(d) causing molten material to be projected as splashes, droplets, and streams into a space above a normal quiescent surface of the molten bath and forming a transition zone; and (e) injecting the heated oxygen-enriched air into the direct smelting vessel 105 via one or more than one lance/tuyere and post-combusting reaction gases, typically carbon monoxide and hydrogen, released from the molten bath and generating temperatures of the order of 2000° C. or higher in the transition zone, whereby the ascending and thereafter descending splashes, droplets and streams of molten material in the transition zone facilitate heat transfer to the molten bath, and whereby the transition zone minimises heat loss from the vessel via the side walls in contact with the transition zone.

The direct smelting vessel 105 may be any suitable vessel.

The preferred direct smelting vessel is the vessel described in general terms hereinafter with reference to FIG. 2, and in more detail in International application PCT/AU99/00537 in the name of the applicant (which corresponds to commonly assigned U.S. patent application Ser. No. 09/535,665) and the disclosure in the patent specification lodged with the International application is incorporated herein by cross-reference.

The vessel 105 shown in FIG. 2 has a hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an outlet 9 for off-gases; a forehearth 77 for discharging molten metal continuously; a forehearth connection 71 that interconnects the hearth and the forehearth 77; and a tap-hole 61 for discharging molten slag.

In use, under steady-state process conditions, the vessel 105 contains the molten bath which includes a layer 15 of molten iron and a layer 16 of molten slag on the iron layer 15. The arrow marked by the numeral 17 indicates the position of the nominal quiescent surface of the iron layer 15 and the arrow marked by the numeral 19 indicates the position of nominal quiescent surface of the slag layer 16. The term "quiescent surface" is understood to mean the surface when there is no injection of gas and solids into the vessel.

The vessel 105 also includes 2 solids injection lances/tuyeres 11 extending downwardly and inwardly at an angle of 30–60° to the vertical through the side walls 5 and into the slag layer 16. The position of the lances/tuyeres 11 is selected so that the lower ends are above the quiescent surface 17 of the iron layer 15 under steady-state process conditions.

In use, under steady-state process conditions, the partially reduced iron ore, coal, and fluxes (typically lime and magnesia) entrained in a carrier gas (typically N2) are injected into the iron layer 15 via the lances/tuyeres 11. The momentum of the solid material/carrier gas causes the solid material and gas to penetrate the iron layer 15. Carbon partially dissolves into the metal and partially remains as solid carbon. The pre-reduced iron ore is smelted to iron and the smelting reaction generates carbon monoxide gas. The gases transported into the iron layer 15 and generated via smelting produce significant buoyancy uplift of molten iron, solid carbon, and slag (drawn into the iron layer 15 as a consequence of solid/gas/injection) from the iron layer 15 which generates an upward movement of splashes, droplets and streams of molten material, and these splashes, and droplets, and streams entrain slag as they move through the slag layer 16.

The buoyancy uplift of molten metal, solid carbon and slag causes substantial agitation in the iron layer 15 and the slag layer 16, with the result that the slag layer 16 expands in volume and has a surface indicated by the arrow 30. The extent of agitation is such that there is reasonably uniform temperature in the metal and the slag regions—typically, 1450–1550° C. with a temperature variation of the order of 30° in each region.

In addition, the upward movement of splashes, droplets and streams of molten material caused by the buoyancy uplift of molten iron, solid carbon, and slag extends into the top space 31 above the molten material in the vessel and:

(a) forms a transition zone 23; and (b) projects some molten material (predominantly slag) beyond the transition zone and onto the part of the upper barrel section 51 of the side walls 5 that is above the transition zone 23 and onto the roof 7.

In general terms, the slag layer 16 is a liquid continuous volume, with gas bubbles therein, and the transition zone 23 is a gas continuous volume with splashes, droplets, and streams of molten metal and slag.

The vessel 105 further includes a lance 13 for injecting the heated oxygen-enriched air into the vessel 105. The lance 13 is centrally located and extends vertically downwardly into the vessel. The position of the lance 13 and the gas flow rate through the lance 13 are selected so that under steady-state process conditions the oxygen-containing gas penetrates the central region of the transition zone 23 and maintains an essentially metal/slag free space 25 around the end of the lance 13.

In use, under steady-state process conditions, the injection of the oxygen-containing gas via the lance 13 post-combusts-reaction gases CO and H2 in the transition zone 23 and in the free space 25 around the end of the lance 13 and generates high temperatures of the order of 2000° C. or higher in the gas space. The heat is transferred to the ascending and descending splashes droplets, and streams, of molten material in the region of gas injection and the heat is then partially transferred to the iron layer 15 when the metal/slag returns to the iron layer 15.

The free space 25 is important to achieving high levels of post combustion because it enables entrainment of gases in the space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten material is to shape the transition zone 23 around the lower region of the lance 13—generally identified by the numerals 27. This shaped region provides a partial barrier to heat transfer by radiation to the side walls 5.

Moreover, under steady-state process conditions, the ascending and descending droplets, splashes and streams of material is an effective means of transferring heat from the transition zone 23 to the molten bath with the result that the temperature of the transition zone 23 in the region of the side walls 5 is of the order of 1450° C.–1550° C.

The vessel 105 is constructed with reference to the levels of the iron layer 15, the slag layer 16, and the transition zone 23 in the vessel 105 when the process is operating under steady-state process conditions and with reference to splashes, droplets and streams of molten material that are projected into the top space 31 above the transition zone 23 when the process is operating under steady-state operating conditions, so that:

(a) the hearth and the lower barrel section 53 of the side walls 5 that contact the iron/slag layers 15/16 are formed from bricks of refractory material (indicated by the cross-hatching in the figure);

(b) at least part of the lower barrel section 53 of the side walls 5 is backed by water cooled panels 8; and (c) the upper barrel section 51 of the side walls 5 and the roof 7 that contact the transition zone 23 and the top space 31 are formed from water cooled panels 57, 59.

Each water cooled panel 8, 57, 59 (not shown) in the upper barrel section 51 of the side walls 5 has parallel upper and lower edges and parallel side edges and is curved so as to define a section of the cylindrical barrel. Each panel includes an inner water cooling pipe and an outer water cooling pipe. The pipes are formed into a serpentine configuration with horizontal sections interconnected by curved sections. Each pipe further includes a water inlet and a water outlet. The pipes are displaced vertically so that the horizontal sections of the outer pipe are not immediately behind the horizontal sections of the inner pipe when viewed from an exposed face of the panel, ie the face that is exposed to the interior of the vessel. Each panel further includes a rammed refractory material which fills the spaces between the adjacent horizontal sections of each pipe and between the pipes. Each panel further includes a support plate which forms an outer surface of the panel.

The water inlets and the water outlets of the pipes are connected to a water supply circuit (not shown) which circulates water at high flow rate through the pipes.

Many modifications may be made to the preferred embodiment described above without departing from the spirit and scope of the present invention.

What is claimed is:

1. A process for direct smelting metalliferous feed material which comprises the steps of:

(a) partially reducing iron oxides in a solid state in a pre-reduction vessel and producing partially reduced iron oxides;

(b) direct smelting partially reduced iron oxides produced in step (a) to molten iron in a direct smelting vessel which contains a molten bat of iron and slag and is supplied with a solid carbonaceous material as a source of reductant and energy and with an oxygen-containing gas for post-combusting carbon monoxide and hydrogen generated in the vessel, the solid carbonaceous material containing sulphur that is volatilised in direct smelting step (b);

(c) generating an off-gas that contains sulphur in direct smelting step (b) and releasing the off-gas from the direct smelting vessel; and (d) using a first stream of the off-gas released from the direct smelting vessel in pre-reduction step (a) to pre-reduce iron oxides in the pre-reduction vessel, and using a second stream of the off-gas as a source of energy for heating air or oxygen-enriched air before supplying the air or oxygen-enriched air as the oxygen-containing gas to the direct smelting vessel, wherein the first stream is less than 60% by volume of the off-gas released from the direct smelting vessel.

2. The process defined in claim 1 wherein step (d) includes controlling the amount of off-gas released from the direct smelting vessel and used in pre-reduction step (a) so that the amount of sulphur in molten iron produced in direct smelting step (b) is less than 0.2 wt % of the total weight of the molten iron.

3. The process defined in claim 1 includes using the second stream for beating and/or for power generation without returning the majority of the sulphur in the second stream to the direct smelting vessel.

4. The process defined in claim 1 includes removing entrained sulphur and alkali salts from the second stream prior to using the second stream as the source of energy for heating air or oxygen-enriched air.

5. The process defined in claim 1 wherein the oxygen-containing gas is air or oxygen-enriched air containing less than 50 volume % oxygen.

6. The process defined in claim 1 wherein pre-reduction step (a) pre-heats the iron oxides to a temperature in the range of 600–1000° C.

7. The process defined in claim 1 includes releasing the off-gas from pre-reduction step (a) and using the offgas as a fuel gas for heating or power generation.

8. The process defined in claim 1 wherein smelting step (b) includes direct smelting partially reduced iron oxides in accordance with the steps of:

(i) forming the molten bath with a molten iron layer and a molten slag layer on the iron layer in the direct smelting vessel;

(ii) injecting the partially reduced iron oxides and coal into the iron layer via a plurality of lances/tuyeres;

(iii) smelting the partially reduced iron oxides to molten iron in the iron layer;

(iv) causing molten material to be projected as splashes, droplets, and streams into a space above a nominal quiescent surface of the molten bath and forming a transition zone; and (v) injecting the oxygen-containing gas into the direct smelting vessel via one or more than one lance/tuyere and post-combusting carbon monoxide and hydrogen released from the molten bath, whereby the ascending and thereafter descending splashes, droplets, and streams of molten material in the transition zone facilitate heat transfer to the molten bath, and whereby the transition zone minimises heat loss from the vessel via a side wall of the vessel that is in contact with the transition zone.

* * * * *